April 19, 1927.  1,625,540

F. HERTZBERG

AUTOMATIC ROTARY SPIDER BUSHING

Filed Aug. 13, 1925  2 Sheets-Sheet 1

Inventor
F. Hertzberg
By
Attorney

April 19, 1927.
F. HERTZBERG
1,625,540
AUTOMATIC ROTARY SPIDER BUSHING
Filed Aug. 13, 1925   2 Sheets-Sheet 2
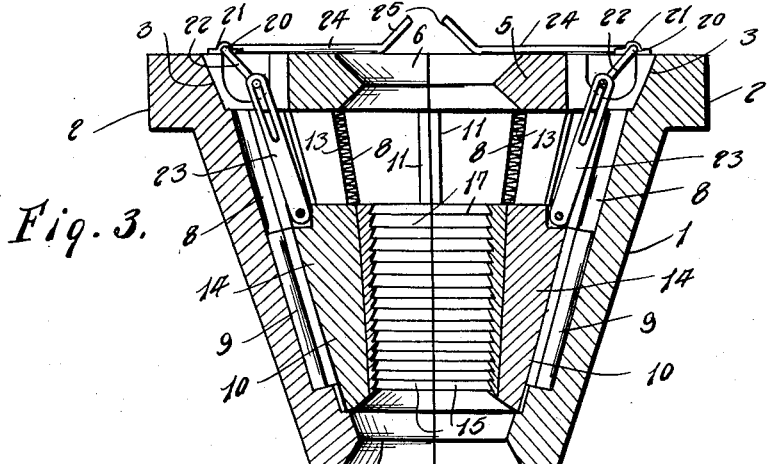
Fig. 3.
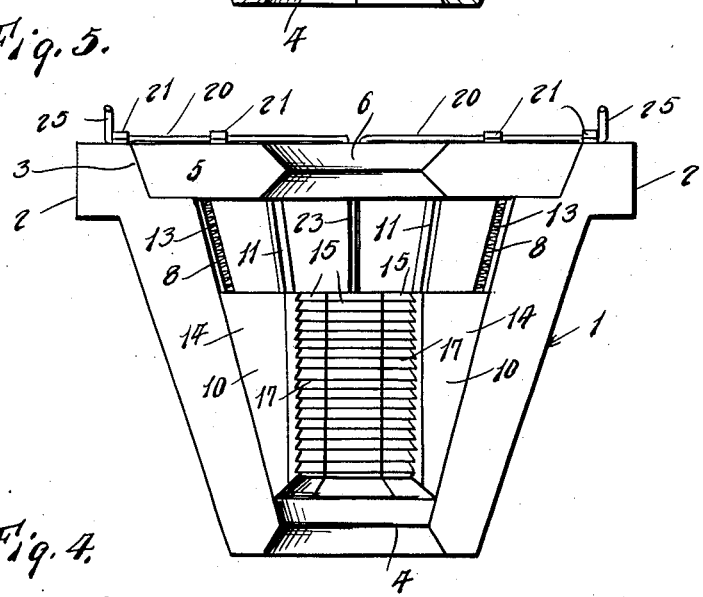
Fig. 5.
Fig. 4.
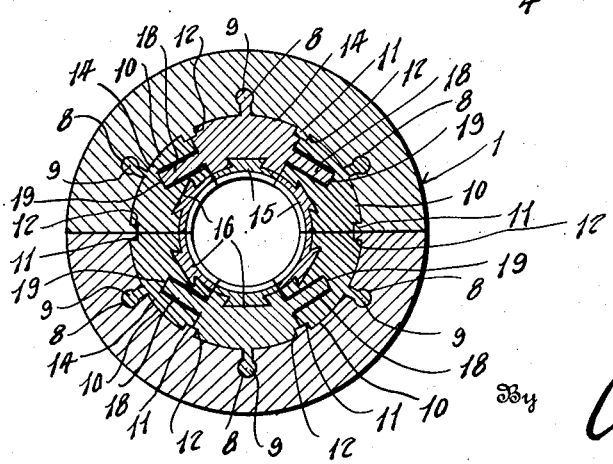
Inventor
F. Hertzberg,
By
Attorney Patented Apr. 19, 1927.

1,625,540

UNITED STATES PATENT OFFICE.

FRANK HERTZBERG, OF LOMITA, CALIFORNIA.

AUTOMATIC ROTARY-SPIDER BUSHING.

Application filed August 13, 1925. Serial No. 50,101.

This invention relates to pipe holding devices of that type used in connection with a rotary or other well drilling apparatus and comprising a bushing or spider carried by the rotatable table of the rotary and slips placed in the bushing when it is desired to support the pipe and removed from the bushing when it is desired to lower the pipe into the well.

The invention has for one of its objects the provision of a pipe holding device of the character stated wherein the slips shall be permanently connected to the bushing or spider whereby to obviate the time and labor now involved in placing the slips in and removing them from the bushing or spider.

A further object of the invention is the provision of a pipe holding device of the character stated which shall include novel and simple means adapted to permit the slips to be readily and quickly raised when it is desired to release the pipe and lowered when it is desired to grip the pipe, the means being carried by the bushing or spider and connected to the slips.

A further object of the invention is the provision of novel and simple means for slidably connecting the slips within the bushing or spider and novel and simple means for preventing injury to said first named means.

The foregoing and other objects are attained by the construction, combination and arrangement of parts hereinafter fully described and claimed, and illustrated in the accompanying drawings, wherein:

Figure 3 is a sectional view taken on the vertical plane indicated by the line 3—3 of Figure 1;

Figure 4 is a sectional view taken on the horizontal plane indicated by the line 4—4 of Figure 1;

Figure 5 is an elevational view of one of the bushing or spider sections and the unit of slips carried thereby.

Corresponding and like parts are referred to in the following description, and designated in the several views of the accompanying drawings, by similar reference numerals.

Figure 1:
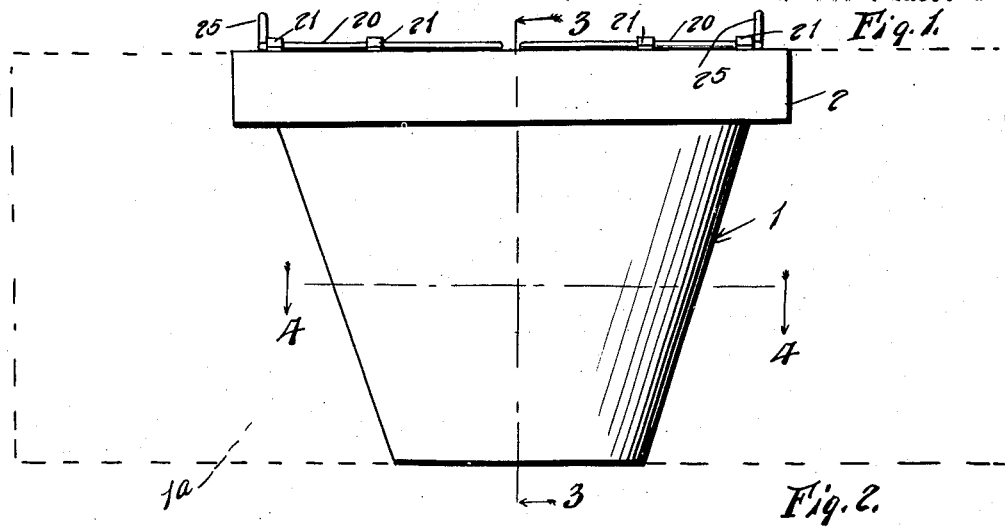
Figure 1 is a view in side elevation of the pipe holding device.
Figure 2:
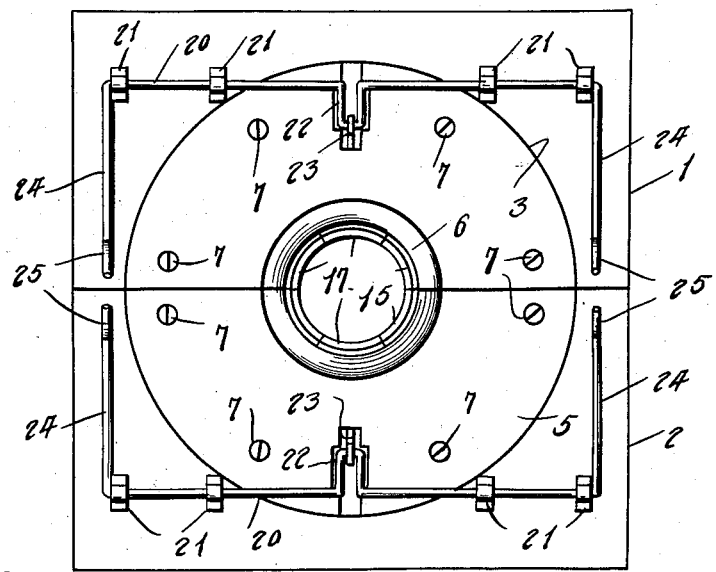
Figure 2 is a top plan view of the pipe holding device.
Figure 6:
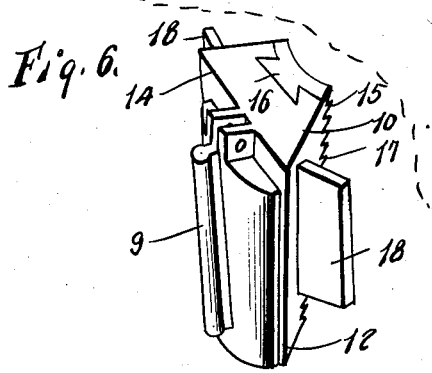
Figure 6 is a detail perspective view of the master or center slip of each unit of slips.

The bushing or spider is designated 1 and is provided at its upper end with an outwardly directed flange 2 for supporting it in the rotatable table of a rotary or other well drilling apparatus. The rotatable table is suggested by dotted lines in Figures 1 and 2 and designated 1ª. It is provided with a conical or tapered central opening and is of sectional formation, the sections thereof being similar. The bushing 1 is provided in its inner upper edge with a groove 3 and at its lower end with an inwardly directed rib 4. A sectional plate 5 having a central opening 6 is seated in the groove 3 and removably secured in place by screws 7. Axially arranged dovetail grooves 8 extend from the horizontal wall of the groove 3 to the rib 4 for the reception of similar ribs 9 on the slips 10.

The vertical dimension of the slips 10 is less than the corresponding dimension of the bushing or spider 1. The ribs 9 permanently and slidably connect the slips 10 to and within the bushing 1. The slips 10 are adapted to be raised with respect to the bushing 1 to release the pipe and lowered with respect to the bushing to grip the pipe. The slips 10 rest upon the shoulders when they are in their lowered or gripping position. Axial ribs 11 carried by the bushing 1 between the grooves 8 engage in grooves 12 in the outer vertical corners of the slips 10, and are adapted to prevent the slips 10 from being rotated with respect to the bushing 1. The slips 10 are yieldingly retained in their lowered or gripping position by springs 13 which are positioned in the grooves 8 between the upper ends of the ribs 9 and the lower side of the plate 5.

The slips 10 each comprise a body portion 14 of relatively soft and a face portion 15 of relatively hard steel. The ribs 9 are formed integrally with the body portions 14. The face portions 15 are provided with dovetail ribs 16 through the medium of which they are secured to the body portions 14. The inner sides of the face portions 15 are of arcuate formation and provided with transversely extending teeth 17. The slips 10 of each bushing section are connected together so as to permit them to be raised or lowered as a unit, and to this end they are connected together by lugs 18 extending from the vertical sides of the center slip and loosely fitting in openings 19 in the side slips.

A shaft 20 journaled as at 21 upon the upper end of each bushing section and provided with a crank 22, and a link 23 connected to the crank 22 and to the center slip of each bushing, provide means by which the slips can be moved into and supported in raised or releasing position. To permit the shafts 20 to be readily operated, they are provided at their ends with levers 24 having upturned handle portions 25.

In practice the slips 10 are retained in a raised or releasing position until it is desired to support the pipe for the purpose of attaching another section thereto and then the shafts 20 are swung to release the slips 10. As soon as they are released, the slips 10 are forced downwardly in the bushing or spider by the springs 13, and when they are in their lowermost position they will grip and hold the pipe. During their downward movement within the bushing or spider, the slips 10 move laterally and radially in the direction of each other, and during their upward movement within the bushing or spider they move laterally and radially away from each other. The plate 5 prevents injury to the slips 10 while they are in raised position. As the shafts are located at the top of the bushing the slips 10 may be readily moved into the desired position.

It is to be understood that the invention is not limited to use in connection with a rotary or other well drilling apparatus as it is capable of being used in other applications necessitating the employment of a bushing or spider and slips. It is further to be understood that the device shown is merely illustrative, and that such changes may be made therein when desired as are within the scope of the invention as claimed.

What is claimed is:

1. In combination, a bushing internally tapered and provided with axial grooves opening out through the inner side thereof, ribs located within the bushing between the grooves and extending axially of the bushing, slips located within the bushing and provided with ribs fitting in said grooves and having their outer vertical corners grooved to receive said ribs, and slip operating means.

2. In combination, a bushing internally tapered, units of slips mounted within the bushing for axial movement with respect thereto, said slips being of less length than the vertical dimension of the bushing, elements loosely connecting the slips of the respective units, shafts journaled on the upper end of the bushing and provided with cranks, and links connected to the cranks and to the upper end of a slip of each unit.

In testimony whereof I affix my signature.

FRANK HERTZBERG.